United States Patent [19]

Rieck

[11] Patent Number: 4,576,731

[45] Date of Patent: Mar. 18, 1986

[54] CONVERSION OF INCOMPATIBLE MIXED POLYOLS TO POLYOL PRODUCTS WITH INCREASED RESISTANCE TO PHASE SEPARATION

[75] Inventor: James N. Rieck, Wheeling, W. Va.

[73] Assignee: Mobay Chemical Corporation, Pittsburgh, Pa.

[21] Appl. No.: 458,424

[22] Filed: Jan. 17, 1983

[51] Int. Cl.$^4$ ................................................ C09K 3/00
[52] U.S. Cl. ....................................... 252/182; 528/76; 528/77; 528/81; 528/83; 528/85
[58] Field of Search .................... 252/182; 528/60, 65, 528/66, 85, 76, 77, 81, 83

[56] References Cited

U.S. PATENT DOCUMENTS

| | | | |
|---|---|---|---|
| 2,912,408 | 11/1959 | Nischk et al. | 260/45.4 |
| 2,998,403 | 8/1961 | Müller et al. | 528/83 |
| 3,079,350 | 2/1963 | Bernstein | 260/215 |
| 3,318,828 | 5/1967 | Seiner | 528/81 |
| 3,993,576 | 11/1976 | Barron | 252/182 |
| 4,029,593 | 6/1977 | Schapel et al. | 252/182 |
| 4,490,302 | 12/1984 | Ma et al. | 260/453 SP |

FOREIGN PATENT DOCUMENTS

| | | |
|---|---|---|
| 1770703 | 11/1971 | Fed. Rep. of Germany . |
| 2309861 | 8/1974 | Fed. Rep. of Germany . |
| 1555759 | 11/1979 | United Kingdom . |

Primary Examiner—Paul Lieberman
Assistant Examiner—Robert A. Wax
Attorney, Agent, or Firm—Gene Harsh; Joseph C. Gil

[57] ABSTRACT

The present invention is directed to a polyol mixture comprising the reaction product of at least two polyols which normally are incompatible with each other and an organic isocyanate, the isocyanate to hydroxyl equivalent ratio being from 1:4 to 1:35.

8 Claims, No Drawings

CONVERSION OF INCOMPATIBLE MIXED POLYOLS TO POLYOL PRODUCTS WITH INCREASED RESISTANCE TO PHASE SEPARATION

BACKGROUND OF THE INVENTION

This invention relates to organic polyhydroxy compounds and, more particularly to a method for improving the compatibility or miscibility of two or more polyols with each other and to a polyol mixture for use in making polyaddition products by reaction with organic polyisocyanates.

This invention especially relates to normally incompatible polyol mixtures comprising at least one high molecular weight polyol and at least one low molecular weight polyol and their conversion to polyol products with greater resistance to phase separation. The modified polyol products obtained are useful in making polyaddition products by reaction with organic polyisocyanates since the modified polyol products still possess polyhydroxyl functionality.

It is known from German Offenlegungsschriften Nos. 1,770,703 and 2,309,861 to use mixtures of polyols which are incompatible with each other for the preparation of polyurethanes. In this way, it is possible to obtain end products which have improved properties, for example, greater heat resistance and higher impact strength. While the use of a mixture of incompatible polyols has the advantages just described, this mixture of polyols also has disadvantages in storage and in methods of processing.

When polyol systems of this kind, which have been thoroughly mixed, are stored for even a relatively short time, i.e., several hours to three days, the mixture separates into two phases so that it must be very vigorously mixed again each time before use in order to insure that the individual components in the mixture will be uniformly distributed through the mixture in the correct proportions. The incompatible polyol mixtures often exhibit miscibility on heating to slightly elevated temperatures. They cloud out, however, at a specific temperature known as the "Cloud Point" when the temperature of the mixture is lowered, and the separation often is accelerated by lower temperatures.

Storage of incompatible polyol mixtures sometimes is accompanied by solidification of one or more of the separated phases. Such solid separation can cause pluggage in metering of components to polyurethane processing machines and make for difficulties in consistent operations. In addition any separated solid phase obtained in storage must be melted and mixed to insure consistent composition as well as to avoid pluggage.

When using polyol mixtures which may separate in from several hours to several days, it is impossible to insure that the individual components of a polyol mixture are uniformly distributed throughout the mixture in the correct proportion unless the polyol mixture is vigorously mixed throughout its storage.

The prior art has attempted to overcome the above-noted problems. As shown in U.S. Pat. No. 4,029,593, the presence of 0.05 to 5 percent by weight of an inert surface-active inorganic material having a specific surface of about 10 to about 800 m²/g in a polyol mixture of two partially incompatible polyols, optionally, with auxiliary agents and additives of the kind commonly used for producing polyurethanes can, to a large extent, prevent rapid settling of one or more components of a mixture of incompatible polyols or partly compatible polyols.

Similarly, U.S. Pat. No. 3,993,576 relates to the same problem and solves that problem by adding a derivative of butylene glycol or propylene glycol to the polyol mix.

It is an object of this invention to provide mixtures of polyols stabilized against separation. It is another object of this invention to provide a method for stabilizing a mixture of polyols by converting them to a mixture less prone to separate while maintaining a useful hydroxyl functionality. It is a further object of this invention to form a polyol mixture which shows less tendency to separation into phases and which does not require additives not commonly present in polyurethanes. It is another object of this invention to produce a polyol mixture reaction product resistant to phase separation at or slightly above room temperature. It is another object of this invention to reduce the tendency for a polyol mixture to separate into phases without markedly altering its useful hydroxyl functionality for reaction with polyisocyanates.

DESCRIPTION OF THE INVENTION

The foregoing objects and others are accomplished in accordance with this invention, generally speaking, by modifying the polyol mixtures which preferably contain at least one high molecular weight polyol and at least one low molecular weight polyol, and which contain at least two polyols which are normally at least partially incompatible or immiscible with each other by addition and reaction of a stabilizing and compatibilizing amount of an isocyanate. The amount of isocyanate used is generally such that the isocyanate to hydroxyl equivalent ratio is from 1:4 to 1:35. After the modification of the polyol mixture by reaction with the isocyanate, the resulting product mixture is possessed of greater compatibility than the starting polyol mixture as evidenced by increased time for separation, and/or by lowered cloud point temperature.

Auxiliary agents and additives of the kind commonly used for producing polyurethanes usually are added to the polyol mixture after reaction with the isocyanate. It is preferred practice to add the auxiliary agents and additives after the isocyanate has been reacted with the starting incompatible polyol mixture since the storage stability is greater.

The polyol mixtures which are modified by reaction with the isocyanate (to obtain more compatible polyol mixtures) preferably contain at least one high molecular weight polyol and at least one low molecular weight polyol. Although more than two polyol components may be present, the polyol mixtures are most commonly binary systems of 1. one or more low molecular weight polyols with hydroxyl numbers in the range of about 800 to about 1800, and 2. one or more higher molecular weight polyols with hydroxyl numbers in the range of about 28 to about 84.

"Incompatible" or "partly compatible" means, in the context of this invention, that at least 1% and usually at least 5% of the polyol mixture separates after 12 hours storage at room temperature (before its modification by the teachings of this invention). The ratio by weight of low-molecular weight polyol to higher molecular weight polyol in the polyol mixture before modification in accordance with the invention herein is generally from 1:5 to 1:20 and preferably from about 1:6 to 1:12. In general, it has been observed that as the low molecular weight polyol component increases, the cloud point also increases.

The low molecular weight polyol may be any organic polyol, e.g., of the type represented by the general formula $$R(OH)_n$$

in which n represents an integer of from 2 to 10, preferably 2 to 4, and R represents an n-valent aliphatic hydrocarbon group containing 2 to 8 carbon atoms, or an araliphatic hydrocarbon group containing 8 to 10 carbon atoms; the group R may also contain hetero atoms, in particular oxygen, in the form of ether, ester, and glycoside groups. Such polyols preferably have molecular weights of from about 62 to about 500.

Examples of suitable low molecular weight polyols include ethylene glycol, propane-1,2-diol, propane-1,3-diol, butane-1,4-diol, butane-1,2-diol, pentane-1,2-diol, pentane-1,5-diol, hexane-1,2-diol, hexane-1,6-diol, glycerol, trimethylol propane, pentaerythritol, sorbitol, sucrose, α-methyl glycoside, diethylene glycol, dipropylene glycol, 1,4-dimethylol-cyclohexane, 1,4-dihydroxycyclohexane, hexane-1,2,6-triol, 1,4-dimethylol benzene, low molecular weight addition products of ethylene oxide and/or propylene oxide with such polyols or also low molecular weight polyhydroxy polyesters, e.g. the esterification product of 1 mol of oxalic acid and 2 mols of ethylene glycol and the like. The most preferred low molecular weight polyols are those containing only two hydroxyl groups, with ethylene glycol and 1,4-butane diol being particularly preferred.

Any suitable organic compound of high molecular weight having at least two hydroxyl groups per molecule may be used as the high molecular weight polyol.

Preferred higher molecular weight polyols include hydroxyl terminated polyesters, -polyethers, -polythioethers, -polyacetals, -polycarbonates and -polyesteramides known per se in polyurethane chemistry which have molecular weights within the range of from 500 to 10,000, preferably from 1000 to 6000, and most preferably from about 1300 to about 4800 with a hydroxyl number within the range of from about 28 to about 84. Suitable polyesters which contain hydroxyl groups are, for example, the reaction products of polyvalent, preferably divalent alcohols with the optional addition of trivalent alcohols and polybasic, preferably dibasic carboxylic acids. Instead of the free polycarboxylic acids, the corresponding polycarboxylic acid anhydrides or corresponding polycarboxylic acid esters of lower alcohols or of their mixtures may be used for preparing the polyesters. The polycarboxylic acids may be aliphatic, cycloaliphatic, aromatic and/or heterocyclic and may be substituted, e.g. with halogen atoms, and/or unsaturated. The following are mentioned as examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid optionally mixed with monomeric fatty acids, dimethyl terephthalate and bis-glycol terephthalate and the like. The polyhydric alcohols used may be, for example, the following: ethylene glycol, propylene-1,2- and -1,3-glycol, butylene-1,4- and 2,3-glycol, hexane-1,6-diol, octane-1,8-diol, neopentyl glycol cyclohexane dimethanol (1,4-bis-hydroxymethyl cyclohexane), 2-methyl-propane-1,3-diol, glycerol, trimethylolpropane, hexane-1,2,6-triol, butane-1,2,4-triol, trimethylol ethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol, polybutylene glycols and the like. The polyesters may also include a portion with carboxy end groups. Polyesters of lactones such as ε-caprolactone or hydroxycarboxylic acids such as ω-hydroxycaproic acid may also be used.

Any suitable polyether which contains at least two, generally two to eight and preferably two or three hydroxyl groups may be used. Such polyethers are known per se and are prepared, e.g., by polymerizing epoxides such as ethylene oxide, propylene oxide, butylene oxide, tetrahydrofuran, styrene oxide or epichlorohydrin, each with itself, e.g. in the presence of boron trifluoride or by the addition of these epoxides, either as mixtures or successively, to starting components which contain reactive hydrogen atoms, such as alcohols or amines, e.g. water, ethylene glycol, propylene-1,3- or -1,2-glycol, trimethylolpropane, 4,4'-dihydroxy diphenyl propane, aniline, ammonia, ethanolamine, or ethylene diamine. Sucrose polyethers, e.g. those described in German Auslegeschrift Nos. 1,176,358 and 1,064,938 may also be used according to the invention. It is frequently preferred to use those polyethers which contain predominantly primary hydroxyl groups (up to 90% by weight, based on all the hydroxyl groups present in the polyether). Polyethers modified with vinyl polymers such as can be obtained, for example, by polymerizing styrene or acrylonitrile in the presence of polyethers (U.S. Pat. Nos. 3,383,351; 3,304,273; 3,523,093; and 3,110,695 and German Patent Specification No. 1,152,536) and polybutadienes which contain hydroxyl groups are also suitable.

Any suitable polythioether may be used such as, for example, the condensation products of thiodiglycol with itself and/or with other glycols, dicarboxylic acids, formaldehyde, aminocarboxylic acids or amino alcohols. The products obtained are polythio mixed ethers, polythioether esters or polythioether ester amides, depending upon the co-components.

The polyacetals used may be, for example, the compounds which can be prepared from glycols such as diethylene glycol, triethylene glycol, 4,4'-dioxethoxydiphenyl dimethylmethane, hexanediol and formaldehyde. Polyacetals suitable for the purpose of the invention can also be prepared by polymerizing cyclic acetals.

Suitable polycarbonates which contain hydroxyl groups are known per se, e.g. those obtained by reacting diols such as propane-1,3-diol, butane-1,4-diol and/or hexane-1,6-diol, diethylene glycol, triethylene glycol or tetraethylene glycol with diaryl carbonates such as diphenyl carbonate or with phosgene.

The polyester amides include, for example, the predominantly linear condensates obtained from polyvalent saturated and unsaturated carboxylic acids or their anhydrides and polyvalent saturated and unsaturated amino alcohols.

The higher molecular weight polyols used are preferably polyhydroxy polyols of the kind mentioned above which contain 2 to 3 hydroxyl groups per molecule.

The modified polyol mixtures of this invention are more resistant to phase separation than the unmodified polyol mixtures, and the cloud points are lowered significantly.

The mixtures according to the invention are easily processed into polyurethanes with known two-component mixing apparatus. This invention makes it possible to form modified polyol mixtures which can be stored without significant separation into their components for significantly longer times than the same polyol mixture without modification.

The preparation of the modified polyol mixtures of this invention are carried out by mixing the low molecular weight polyols and the high molecular weight polyols and reacting them with the isocyanate until the isocyanate groups are consumed, preferably with the exclusion of atmospheric moisture.

The auxiliary substances and additives which may be added to the modified polyol mixtures prior to their use as the polyol component fed to a polyurethane processing machine are mainly the stabilizers, activators and/or blowing agents generally known in polyurethane chemistry such as those described, for example, in Kunststoff-Handbuch, Volume VII, Carl-Hanser-Verlag, Munich, 1966. Stabilizers include, e.g., the usual polysiloxane stabilizers known per se which are used for the preparation of polyurethane foams. Activators include the normal catalysts or polyurethane chemistry such as, e.g. organic tin salts such as dibutyl tin-dilaurate or organic tertiary amines such as triethylene diamine, permethylated diethylene-triamine, N,N-dimethylbenzylamine, etc. Blowing agents include, e.g., water or halogenated hydrocarbons such as difluorodichloromethane, trifluoromonochloromethane or monofluorotrichloromethane.

The isocyanates which are employed to modify the polyols to compatibilize them include substantially any organic isocyanate, including mono-, di- and polyisocyanates. Such isocyanates may be aliphatic, cycloaliphatic, araliphatic, aromatic and/or heterocyclic. Suitable isocyanates include tetramethylene diisocyanate, hexamethylene diisocyanate, 1,4-phenylene diisocyanate, 1,3-phenylene diisocyanate, 1,4-cyclohexylene diisocyanate, 2,4-tolylene diisocyanate, 2,5-tolylene diisocyanate, 2,6-tolylene diisocyanate, 3,5-tolylene diisocyanate, 4-chloro-1,3-phenylene diisocyanate, 1-methoxy-2,4-phenylene diisocyanate, 1-methyl-3,5-diethyl-2,6-phenylene diisocyanate, 1,3,5-triethyl-2,4-phenylene diisocyanate, 1-methyl-3,5-diethyl-2,4-phenylene diisocyanate, 1-ethyl-3,5-diethyl-6-chloro-2,4-phenylene diisocyanate, 6-methyl-2,4-diethyl-5-nitro-1,3-phenylene diisocyanate, p-xylylene diisocyanate, m-xylylene diisocyanate, 4,6-dimethyl-1,3-xylylene diisocyanate, 1,3-dimethyl-4,6-bis-(β-isocyanatoethyl) benzene, 3-(α-isocyanatoethyl) phenylisocyanate, 1-methyl-2,4-cyclohexylene diisocyanate, 4,4'-biphenylene diisocyanate, 3,3'-dimethyl-4,4'-biphenylene diisocyanate, 3,3'-dimethoxy-4,4'-biphenylene diisocyanate, 3,3'-diethoxy-4,4'-biphenylene diisocyanate, 1,1'-bis-(4-isocyanatophenyl) cyclohexane, methylene bis(cyclohexylisocyanate), isophorone diisocyanate, 4,4'-diisocyanato-diphenylmethane, 4,4'-diisocyanato-3,3'-dimethyldiphenylmethane, 4,4'-diisocyanato-3,3'-dichlorodiphenylmethane, 4,4'-diisocyanatodiphenyldimethylmethane, 1,5-naphthylene diisocyanate, 1,4-naphthylene diisocyanate, 2,4,4'-triisocyanatodiphenylether, 2,4,6-triisocyanato-1-methyl-3,5-diethylbenzene, and mixtures thereof.

In the present invention it is also possible, for example, to use triphenyl methane-4,4',4"-triisocyanate, polyphenyl polymethylene polyisocyanates of the type obtained by condensing aniline with formaldehyde followed by phosgenation, and described, for example, in British Pat. Nos. 874,430 and 848,671. Also suitable for the present invention are m- and p-isocyanatophenyl sulfonyl isocyanates according to U.S. Pat. No. 3,454,606, perchlorinated aryl polyisocyanates of the type described, for example, in German Auslegeschrift No. 1,157,601 (U.S. Pat. No. 3,277,138), polyisocyanates containing carbodiimide groups of the type described in German Pat. No. 1,092,007 (U.S. Pat. No. 3,152,162) and in German Offenlegungsschriften Nos. 2,504,400, 2,537,685 and 2,552,350. Further suitable isocyanates are the norbornane diisocyanates according to U.S. Pat. No. 3,492,330 and polyisocyanates containing allophanate groups of the type described, for example, in British Pat. No. 994,890, Belgian Pat. No. 761,626 and in Dutch Patent Application No. 7,102,524. Additional suitable polyisocyanates containing isocyanurate groups of the type described are, for example, in U.S. Pat. No. 3,001,973, German Pat. Nos. 1,022,789, 1,222,067 and 1,027,394 and in German Offenlegungsschriften Nos. 1,929,034 and 2,004,048, polyisocyanates containing urethane groups of the type described, for example, in Belgian Pat. No. 752,261 or in U.S. Pat. Nos. 3,394,164 and 3,644,457. Polyisocyanates containing acylated urea groups according to German Pat. No. 1,230,778 and polyisocyanates containing biuret groups of the type described, for example, in U.S. Pat. Nos. 3,124,605, 3,201,372 and 3,124,605 and in British Pat. No. 889,050 are also suitable for use in the instant invention. Polyisocyanates produced by telomerization reactions of the type described, for example, in U.S. Pat. No. 3,654,106 and polyisocyanates containing ester groups of the type described, for example, in British Pat. Nos. 965,474 and 1,072,956, in U.S. Pat. No. 3,567,763 and in German Pat. No. 1,231,688 and also reaction products of the above-mentioned isocyanates with acetals according to German Pat. No. 1,072,385 and polyisocyanates containing polymeric fatty acid esters according to U.S. Pat. No. 3,455,883 are further suitable compounds for use in the instant invention.

It is also possible to use the isocyanate-group-containing distillation residues obtained in the commercial production of isocyanates, optionally in solution in one or more of the above-mentioned polyisocyanates. It is also possible to use any mixture of the above-mentioned polyisocyanates.

In general, it is particularly preferred to use the commercially readily available polyisocyanates, for example, 2,4- and 2,6-tolylene diisocyanate, also any mixtures of these isomers ("TDI"), polyphenyl polymethylene polyisocyanates of the type obtained by condensing aniline with formaldehyde, followed by phosgenation ("crude MDI") and polyisocyanates containing carbodiimide groups, urethane groups, allophanate groups, isocyanurate groups, urea groups or biuret groups ("modified polyisocyanates"), particularly modified polyisocyanates of the type derived from 2,4- and/or 2,6-tolylene diisocyanate or from 4,4'- and/or 2,4'-diphenylmethane diisocyanate.

It is presently most preferred to use aromatic diisocyanates since the advantageous effects are not as pronounced using other types of isocyanates.

The amount of isocyanate reacted for compatibilization of the polyol mixture of high and low molecular weight polyols is chosen such that the isocyanate to hydroxyl equivalent ratio is generally from about 1:4 to about 1:35, preferably from about 1:6 to about 1:25 and most preferably from about 1:7 to about 1:15.

The preparation of the modified polyol mixtures by reaction with the isocyanate is carried out in stirrer vessels, preferably with the exclusion of atmospheric moisture. The reaction is run at a temperature and for a time period sufficient to produce a modified polyol mixture with no free NCO groups. The temperatures of reaction are chosen based on the reactivity of the polyol and the isocyanate. The temperatures commonly employed ranged from room temperature to 100° C., with a preferred temperature range being at 60°–70° C. The reaction times are chosen to ensure that the mixture contains no free isocyanate groups and can generally vary from 1 to 16 hours with around 2 to 3 hours usually being sufficient to eliminate free NCO groups.

The amount of diisocyanate employed for compatibilization is chosen to effect compatibilization of the polyol mixture and is selected to leave sufficient hydroxyl functionality for subsequent production of polyurethane products by reaction with diisocyanate, e.g., in two-component mixing machines.

While the viscosity of the modified polyols can be altered for use with specific process machinery, all that is necessary as far as the viscosity is concerned is that the mixture be useable in the equipment chosen.

The modified polyols of this invention are useful for the production of polyurethanes with a great range of densities. The modified polyols of this invention can also be used in formation of polyurethane elastomer products. They also have utility in formation of semi-rigid to rigid molded polyurethane foam products which have a compact or dense marginal zone on one or all sides.

In the examples which follow, the following materials are used:

POLYOL A is a polyester diol having an OH number of 28 and is prepared from adipic acid and equal molar amounts of ethylene glycol and 1,4-butane diol (equivalent wt. of polyester = 1000)

POLYOL B is a polyether diol having an OH number of about 56 and is prepared from propylene glycol, propylene oxide and ethylene oxide, the weight ratio of propylene oxide to ethylene oxide being about 4:1 (equivalent wt. = 2000)

POLYOL C is a polyether triol having an OH number of 35 and is prepared from glycerine, propylene oxide and ethylene oxide, the weight ratio of propylene oxide to ethylene oxide being about 7:1 (equivalent wt. = 1600)

POLYOL D is a polyester diol having an OH number of about 45 and is prepared from diethylene glycol and adipic acid (equivalent wt. = 1500)

POLYOL E is a polyester having an OH number of about 60, and an average functionality of about 2.8 and is prepared from adipic acid, diethylene glycol and trimethylolpropane EG is ethylene glycol XB is 1,4-butane diol.

EXAMPLES

Several polyol blends were first prepared. The blends were made by merely mixing the components noted. The blends and the cloud points of the blends were as follows:

BLEND #1: 1500 parts by weight of POLYOL A and 200 parts by weight of XB. The cloud point of the blend was 57° C.

BLEND #2: 180 parts by weight of POLYOL A and 20 parts by weight of XB. The cloud point of the blend was 49° C.

BLEND #3: 109.3 parts by weight of POLYOL A, 7.3 parts by weight of XB, and 5.0 parts of EG. The cloud point of the blend was between 49 and 55° C.

BLEND #4: 102.2 parts by weight of POLYOL A and 9.4 parts of EG. The cloud point of the blend was about 44° C.

BLEND #5: 800 parts by weight of POLYOL A and 106.7 parts by weight of EG. The cloud point of the blend was 64° C.

BLEND #6: 66.43 parts by weight of POLYOL B, 18.05 parts by weight of POLYOL C, and 9.12 parts by weight of XB. The cloud point of the blend was 14° C.

BLEND #7: 70.13 parts by weight of POLYOL B, 12.87 parts by weight of POLYOL C, and 10.3 parts by weight of XB. The cloud point of the blend was 23°–24° C.

BLEND #8: 800 parts by weight of POLYOL D and 110.2 parts by weight of EG. The cloud point of the blend was 48° C.

BLEND #9: 803 parts by weight of POLYOL D and 142 parts by weight of XB. The cloud point of the blend was about 64° C.

BLEND #10: 105.9 parts by weight of POLYOL D, 6.22 parts by weight of POLYOL E and 18.7 parts by weight of XB. The cloud point of the blend was about 62° C.

BLEND #11: 1500 parts by weight of POLYOL A, 300 parts by weight of POLYOL E, and 180 parts by weight of XB. The cloud point of the blend was about 40° C.

The above noted blends were then modified by reaction with various isocyanates. In general, the blend itself was first heated to the temperature noted in the following table and maintained at that temperature until all of the isocyanate groups had reacted (as determined by infrared analysis). The resultant modified polyols were then evaluated for cloud points. The following isocyanates were used:

MDI is methylene bis(phenyl isocyanate).

IPDI is isophorone diisocyanate.

TD-65 is a 65/35 weight ratio mixture of 2,4-toluene diisocyanate and 2,6-toluene diisocyanate.

TDS is 2,4-toluene diisocyanate.

TD is an 80/20 weight ratio mixture of 2,4-toluene diisocyanate and 2,6-toluene diisocyanate.

MMDI is a modified isocyanate prepared by reacting methylene bis(phenyl isocyanate) with tripropylene glycol, the resultant product having an NCO group content of about 23% by weight.

MDIM is a modified isocyanate prepared by reacting methylene bis(phenyl isocyanate) with POLYOL A, the resultant product having an NCO group content of about 19% by weight.

MMDIM is a modified isocyanate prepared by reacting methylene bis(phenyl isocyanate) with POLYOL D, the resultant product having an NCO group content of about 19% by weight.

In the table which follows are set forth the parts by weight of each material used, the reaction temperatures, the time the reaction temperature was maintained, the isocyanate to hydroxyl equivalent ratio, and the cloud point both before and after isocyanate modification. In the column titled "CLOUD POINT AFTER MODIFICATION", the abbreviation "ND" means not determined.

| EXAMPLE | BLEND, PBW | ISOCYANATE, PBW | REACTION TEMP, °C | REACTION TIME, HRS. | NCO/OH EQUIVALENT RATIO | CLOUD POINT BEFORE MODIFICATION | CLOUD POINT AFTER MODIFICATION |
|---|---|---|---|---|---|---|---|
| 1 | BLEND #1, 200 | MDI, 4.37 | 70° C. | 3 | 1:20 | 57° C. | 44° C. |
| 2 | BLEND #1, 200 | MDI, 6.55 | 70° C. | 3 | 1:13 | 57° C. | ND |
| 3 | BLEND #1, 200 | MDI, 8.74 | 70° C. | 3 | 1:10 | 57° C. | ND |
| 4 | BLEND #1, 200 | MDI, 10.93 | 70° C. | 3 | 1:8 | 57° C. | 50° C. |
| 5 | BLEND #1, 200 | IPDI, 3.88 | 60° C. | 8 | 1:20 | 57° C. | 53° C. |
| 6 | BLEND #1, 200 | IPDI, 6.21 | 60° C. | 8 | 1:12.5 | 57° C. | 50° C. |
| 7 | BLEND #1, 200 | IPDI, 8.54 | 60° C. | 8 | 1:9 | 57° C. | 43° C. |
| 8 | BLEND #1, 200 | IPDI, 10.87 | 60° C. | 8 | 1:7 | 57° C. | 49° C. |
| 9 | BLEND #1, 200 | TD-65, 4.86 | 70° C. | 3 | 1:12.5 | 57° C. | ND cloudy at 25° C. |
| 10 | BLEND #1, 200 | TD-65, 5.46 | 70° C. | 3 | 1:11 | 57° C. | ND clear at 25° C. |
| 11 | BLEND #1, 200 | TD-65, 6.08 | 70° C. | 3 | 1:10 | 57° C. | ND cloudy at 25° C. |
| 12 | BLEND #1, 200 | TD-65, 6.69 | 70° C. | 3 | 1:9 | 57° C. | ND cloudy at 25° C. |
| 13 | BLEND #1, 200 | TDS, 4.86 | 70° C. | 3 | 1:12.5 | 57° C. | ND cloudy at 25° C. |
| 14 | BLEND #1, 200 | TDS, 5.46 | 70° C. | 3 | 1:11 | 57° C. | ND clear at 25° C. |
| 15 | BLEND #1, 200 | TDS, 6.08 | 70° C. | 3 | 1:10 | 57° C. | ND cloudy at 25° C. |
| 16 | BLEND #1, 200 | TDS, 6.69 | 70° C. | 3 | 1:9 | 57° C. | ND cloudy at 25° C. |
| 17 | BLEND #1, 9850 | TD 80, 332 | 60° C. | 2½ | 1:9 | 57° C. | ND clear at 25° C. |
| 18 | BLEND #2, 170 | MDI, 3.6 | 50° C. | 16 | 1:18 | 49° C. | 32–35° C. |
| 19 | BLEND #2, 150 | MDI, 3.1 | 50° C. | 16 | 1:19 | 49° C. | 35° C. |
| 20 | BLEND #2, 150 | MDI, 6.5 | 50° C. | 16 | 1:9 | 49° C. | >49° C. ⎫ |
| 21 | BLEND #2, 150 | MDI, 10.3 | 50° C. | 16 | 1:6 | 49° C. | >49° C. ⎬ all were cloudy at 49° C. |
| 22 | BLEND #2, 150 | MDI, 14.6 | 50° C. | 16 | 1:4 | 49° C. | >49° C. ⎭ |
| 23 | BLEND #2, 150 | MDI, 4.5 | 50° C. | 16 | 1:9 | 49° C. | ND clear at 25° C. |
| 24 | BLEND #2, 100 | TD, 2 | 50° C. | 16 | 1:14 | 49° C. | 32° C. |
| 25 | BLEND #2, 100 | TD, 3 | 50° C. | 16 | 1:9 | 49° C. | 29° C. |
| 26 | BLEND #2, 100 | TD, 4 | 50° C. | 16 | 1:7 | 49° C. | 29° C. |
| 27 | BLEND #3, 121.6 | TD, 3.58 | 70° C. | 4 | 1:10.5 | 49–55° C. | ND clear at 25° C. |
| 28 | BLEND #4, 200 | TD, 5.2 | 70° C. | 1½ | 1:12 | 44° C. | 25° C. |
| 29 | BLEND #4, 200 | TD, 5.7 | 70° C. | 1½ | 1:11 | 44° C. | 23° C. |
| 30 | BLEND #4, 200 | TD, 6.3 | 70° C. | 1½ | 1:10 | 44° C. | 10° C. |
| 31 | BLEND #4, 111.6 | TD, 6.9 | 70° C. | 1½ | 1:9 | 44° C. | 9° C. |
| 32 | BLEND #5, 200 | TD, 3.9 | 70° C. | 3 | 1:11 | 44° C. | Clear at 27° C. |
| 33 | BLEND #5, 200 | TD, 7.3 | 70° C. | 3 | 1:9.5 | 64° C. | Hazy at 22° C. |
| 34 | BLEND #5, 200 | TD, 8.54 | 70° C. | 3 | 1:8 | 64° C. | Almost clear at 22° C. |
| 35 | BLEND #5, 200 | TD, 9.76 | 70° C. | 3 | 1:7 | 64° C. | Hazy at 22° C. |
| 36 | BLEND #6, 200 | TD, 11.0 | 70° C. | 3 | 1:7 | 64° C. | Hazy at 22° C. |
| 37 | BLEND #6, 200 | TD, 3.68 | 70° C. | 2–3 | 1:12 | 14° C. | ND ⎫ |
| 38 | BLEND #6, 200 | TD, 4.59 | 70° C. | 2–3 | 1:10 | 14° C. | ND ⎬ But all clear at 5° C. |
| 39 | BLEND #6, 200 | TD, 5.51 | 70° C. | 2–3 | 1:8 | 14° C. | ND ⎭ |
| 40 | BLEND #6, 200 | TD, 6.43 | 70° C. | 2–3 | 1:7 | 14° C. | ND |
| 41 | BLEND #7, 200 | TD, 4.06 | 70° C. | 2–3 | 1:12.5 | 23–24° C. | ND |
| 42 | BLEND #7, 200 | TD, 5.07 | 70° C. | 2–3 | 1:10 | 23–24° C. | ND |
| 43 | BLEND #7, 200 | TD, 6.08 | 70° C. | 2–3 | 1:8 | 23–24° C. | ND |
| 44 | BLEND #7, 200 | TD, 7.09 | 70° C. | 2–3 | 1:7 | 48° C. | ND |
| 45 | BLEND #8, 200 | TD, 7.03 | 70° C. | 2–3 | 1:11 | 48° C. | ND hazy at 25° C. |
| 46 | BLEND #8, 200 | TD, 7.81 | 70° C. | 2–3 | 1:10 | 48° C. | ND hazy at 25° C. |
| 47 | BLEND #8, 200 | TD, 8.6 | 70° C. | 2–3 | 1:9 | 48° C. | ND clear at 25° C. |
| 48 | BLEND #8, 200 | TD, 9.37 | 70° C. | 2–3 | 1:8 | 48° C. | ND clear at 25° C. |
| 49 | BLEND #9, 200 | TD, 6.8 | 70° C. | 2 | 1:10 | 64° C. | Hazy at 27° C. |
| 50 | BLEND #9, 200 | TD, 7.5 | 70° C. | 2 | 1:9 | 64° C. | Hazy at 27° C. |

-continued

| EXAMPLE | BLEND #, PBW | ISOCYANATE, PBW | | REACTION TEMP, °C | REACTION TIME, HRS. | NCO/OH EQUIVALENT RATIO | CLOUD POINT BEFORE MODIFICATION | CLOUD POINT AFTER MODIFICATION |
|---|---|---|---|---|---|---|---|---|
| 51 | BLEND #9, 200 | TD | 8.2 | 70° C. | 2 | 1:8 | 64° C. | Almost clear at 27° C. |
| 52 | BLEND #9, 200 | TD | 8.8 | 70° C. | 2 | 1:8 | 64° C. | Almost clear at 27° C. |
| 53 | BLEND #10, 130.8 | TD | 5.56 | 70° C. | 2½ | 1:8 | 60° C. | Clear at 5° C. |
| 54 | BLEND #10, 200 | MMDI | 6.45 | 70° C. | 2 | 1:22 | 62° C. | 50° C. |
| 55 | BLEND #10, 200 | MMDI | 8.6 | 70° C. | 2 | 1:16.4 | 62° C. | 46° C. |
| 56 | BLEND #10, 200 | MMDI | 10.75 | 70° C. | 2 | 1:13.2 | 62° C. | 42° C. |
| 57 | BLEND #10, 200 | MMDI | 12.9 | 70° C. | 2 | 1:11 | 62° C. | 37° C. |
| 58 | BLEND #10, 200 | MMDI | 15.0 | 70° C. | 2 | 1:9.4 | 62° C. | 34° C. |
| 59 | BLEND #10, 200 | MMDI | 17.2 | 70° C. | 2 | 1:8.3 | 62° C. | 30° C. |
| 60 | BLEND #10, 200 | MMDI | 19.3 | 70° C. | 2 | 1:7.4 | 62° C. | 25° C. |
| 61 | BLEND #10, 200 | MMDI | 21.5 | 70° C. | 2 | 1:6.6 | 62° C. | 30° C. |
| 62 | BLEND #10, 200 | MDIM | 7.8 | 70° C. | 2 | 1:22 | 62° C. | 50° C. |
| 63 | BLEND #10, 200 | MDIM | 10.4 | 70° C. | 2 | 1:16.4 | 62° C. | 46° C. |
| 64 | BLEND #10, 200 | MDIM | 13.1 | 70° C. | 2 | 1:13.2 | 62° C. | 42° C. |
| 65 | BLEND #10, 200 | MDIM | 7.8 | 70° C. | 2 | 1:22 | 62° C. | 50° C. |
| 66 | BLEND #10, 200 | MDIM | 10.4 | 70° C. | 2 | 1:16.4 | 62° C. | 46° C. |
| 67 | BLEND #10, 200 | MDIM | 13.1 | 70° C. | 2 | 1:13.2 | 62° C. | 42° C. |
| 68 | BLEND #10, 200 | MDI | 2.9 | 70° C. | 1 | 1:33 | 62° C. | 55° C. |
| 69 | BLEND #10, 200 | MDI | 3.4 | 70° C. | 1 | 1:29 | 62° C. | 54° C. |
| 70 | BLEND #10, 200 | MDI | 3.9 | 70° C. | 1 | 1:25 | 62° C. | 53° C. |
| 71 | BLEND #10, 200 | MDI | 4.4 | 70° C. | 1 | 1:22 | 62° C. | 52° C. |
| 72 | BLEND #10, 200 | MDI | 4.9 | 70° C. | 1 | 1:20 | 62° C. | 50° C. |
| 73 | BLEND #10, 200 | MDI/TD | 2.9/6.3 | 70° C. | 1½ | 1:8 | 62° C. | opalescence at 30° C. |
| 74 | BLEND #10, 200 | MDI/TD | 2.9/5.4 | 70° C. | 1½ | 1:9 | 62° C. | 38° C. |
| 75 | BLEND #10, 200 | MDI/TD | 2.9/4.7 | 70° C. | 1½ | 1:10 | 62° C. | 40° C. |
| 76 | BLEND #10, 200 | MDI/TD | 2.9/4.0 | 70° C. | 1½ | 1:11 | 62° C. | 43° C. |
| 77 | BLEND #10, 200 | MDI/TD | 4.9/6.3 | 70° C. | 2 | 1:7 | 62° C. | opalescence at 20° C. |
| 78 | BLEND #10, 200 | MDI/TD | 4.9/5.4 | 70° C. | 2 | 1:7.7 | 62° C. | opalescence at 20° C. |
| 79 | BLEND #10, 200 | MDI/TD | 4.9/4.7 | 70° C. | 2 | 1:8.3 | 62° C. | 34° C. |
| 80 | BLEND #10, 200 | MDI/TD | 4.9/4.0 | 70° C. | 2 | 1:9 | 62° C. | 38° C. |
| 81 | BLEND #10, 200 | MDI/TD | 4.9/3.3 | 70° C. | 2 | 1:10 | 62° C. | 40° C. |
| 82 | BLEND #10, 200 | MDI/TD | 4.9/2.6 | 70° C. | 2 | 1:11 | 62° C. | 43° C. |
| 83 | BLEND #10, 800 | TD | 32.4 | 70° C. | 1 | 1:8.3 | 62° C. | opalescence at 5° C. |
| 84 | BLEND #10, 800 | TD | 32.4 | 100° C. | 2½ | 1:8.3 | 62° C. | opalescence at 5° C. |
| 85 | BLEND #10, 200 | TD | 8.1 | 70° C. | 2½ | 1:8.3 | 62° C. | not cloudy at 5° C. |
| 86 | BLEND #10, 200 | TD | 6.75 | 70° C. | 2½ | 1:10 | 62° C. | 40° C. |
| 87 | BLEND #10, 200 | TD | 5.4 | 70° C. | 2 | 1:12.5 | 62° C. | 45° C. |
| 88 | BLEND #10, 200 | TD | 4.05 | 70° C. | 2½ | 1:16.7 | 62° C. | 51° C. |
| 89 | BLEND #10, 200 | TD | 2.7 | 70° C. | 2½ | 1:25 | 62° C. | 54° C. |
| 90 | BLEND #10, 200 | TD/MMDI | 3.07/5.37 | 70° C. | 2 | 1:12 | 62° C. | 43° C. |
| 91 | BLEND #10, 200 | TD/MMDI | 3.07/6.45 | 70° C. | 2 | 1:11 | 62° C. | 41° C. |
| 92 | BLEND #10, 200 | TD/MMDI | 3.07/7.52 | 70° C. | 2 | 1:10.2 | 62° C. | 39° C. |
| 93 | BLEND #10, 200 | TD/MMDI | 3.07/8.6 | 70° C. | 2 | 1:9.4 | 62° C. | 37° C. |
| 94 | BLEND #11, 200 | TD | 4.61 | 70° C. | 2½ | 1:11.1 | 40° C. | 10° C. |
| 95 | BLEND #11, 200 | TD | 3.84 | 70° C. | 2½ | 1:13.3 | 40° C. | 25° C. |
| 96 | BLEND #11, 200 | TD | 3.07 | 70° C. | 2½ | 1:16.7 | 40° C. | 31° C. |
| 97 | BLEND #11, 200 | TD | 2.3 | 70° C. | 2½ | 1:22.2 | 40° C. | 34° C. |
| 98 | BLEND #11, 200 | TD | 1.54 | 70° C. | 2½ | 1:33.3 | 40° C. | 36° C. |
| 99 | BLEND #11, 200 | MMDI | 6.45 | 70° C. | 2 | 1:16.7 | 40° C. | 25° C. |
| 100. | BLEND #11, 200 | MMDI | 8.6 | 70° C. | 2 | 1:12.5 | 40° C. | 20° C. |

-continued

| EXAMPLE | BLEND #, PBW | ISOCYANATE, PBW | REACTION TEMP, °C. | REACTION TIME, HRS. | NCO/OH EQUIVALENT RATIO | CLOUD POINT BEFORE MODIFICATION | CLOUD POINT AFTER MODIFICATION |
|---|---|---|---|---|---|---|---|
| 101 | BLEND #11, 200 | MMDI 10.75 | 70° C. | 2 | 1:10 | 40° C. | 12° C. |
| 102 | BLEND #11, 200 | MMDI 12.9 | 70° C. | 2 | 1:8.3 | 40° C. | 5° C. |
| 103 | BLEND #11, 200 | MMDI 15.05 | 70° C. | 2 | 1:7.1 | 40° C. | 5° C. |
| 104 | BLEND #11, 200 | MDI 2.2 | 70° C. | 1 | 1:33 | 40° C. | 34° C. |
| 105 | BLEND #11, 200 | MDI 2.6 | 70° C. | 1 | 1:28.3 | 40° C. | 32° C. |
| 106 | BLEND #11, 200 | MDI 3.0 | 70° C. | 1 | 1:24.5 | 40° C. | 31° C. |
| 107 | BLEND #11, 200 | MDI 3.4 | 70° C. | 1 | 1:21.6 | 40° C. | 30° C. |
| 108 | BLEND #11, 200 | MDI 3.8 | 70° C. | 1 | 1:19.4 | 40° C. | 28° C. |
| 109 | BLEND #11, 200 | MDI/TD 2.2/3.6 | 70° C. | 1½ | 1:10 | 40° C. | 12° C. |
| 110 | BLEND #11, 200 | MDI/TD 2.2/3.1 | 70° C. | 1½ | 1:11.1 | 40° C. | 18° C. |
| 111 | BLEND #11, 200 | MDI/TD 2.2/2.6 | 70° C. | 1½ | 1:12.5 | 40° C. | 22° C. |
| 112 | BLEND #11, 200 | MDI/TD 2.2/2.1 | 70° C. | 1½ | 1:14.3 | 40° C. | 24° C. |
| 113 | BLEND #11, 200 | MDI/TD 3.7/3.6 | 70° C. | 2 | 1:8.3 | 40° C. | 10° C. |
| 114 | BLEND #11, 200 | MDI/TD 3.7/3.1 | 70° C. | 2 | 1:9.1 | 40° C. | 10° C. |
| 115 | BLEND #11, 200 | MDI/TD 3.7/2.6 | 70° C. | 2 | 1:10 | 40° C. | 10° C. |
| 116 | BLEND #11, 200 | MDI/TD 3.7/2.1 | 70° C. | 2 | 1:11 | 40° C. | 21° C. |
| 117 | BLEND #11, 200 | MDI/TD 3.7/1.6 | 70° C. | 2 | 1:12.5 | 40° C. | 23° C. |
| 118 | BLEND #11, 200 | MDI/TD 3.7/1.1 | 70° C. | 2 | 1:14.3 | 40° C. | 26° C. |
| 119 | BLEND #11, 800 | MDI/TD 14.8/12.4 | 70° C. | 2 | 1:9.1 | 40° C. | 10° C. |
| 120 | BLEND #11, 800 | MDI/TD 14.8/12.4 | 100° C. | 1 | 1:9.1 | 40° C. | 10° C. |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyol mixture comprising the reaction product of at least two polyols which normally are incompatible with each other and an organic isocyanate, the isocyanate to hydroxyl equivalent ratio being from 1:4 to 1:35, wherein the mixture is a liquid.

2. The polyol mixture of claim 1 wherein the incompatible polyols comprise at least one high molecular weight polyol and at least one low molecular weight polyol.

3. The polyol mixture of claim 2 wherein the isocyanate to hydroxyl equivalent ratio is from about 1:6 to about 1:25.

4. A method for converting a mixture of incompatible polyols into a liquid composition more resistant to phase separation comprising reacting said mixture of polyols with an isocyanate at an isocyanate to hydroxyl equivalent ratio of from 1:4 to 1:35.

5. The method of claim 4 wherein the mixture of polyols contains a major portion of hydroxyl terminated polyesters.

6. The method of claim 5 wherein the mixture of polyols contains a minor portion of ethylene glycol.

7. The method of claim 5 wherein the mixture of polyols contains a minor portion of 1,4-butane diol.

8. The method of claim 5 wherein the mixture of polyols is reacted with one or more isomers of tolylene diisocyanate.

* * * * *